Figure 2:
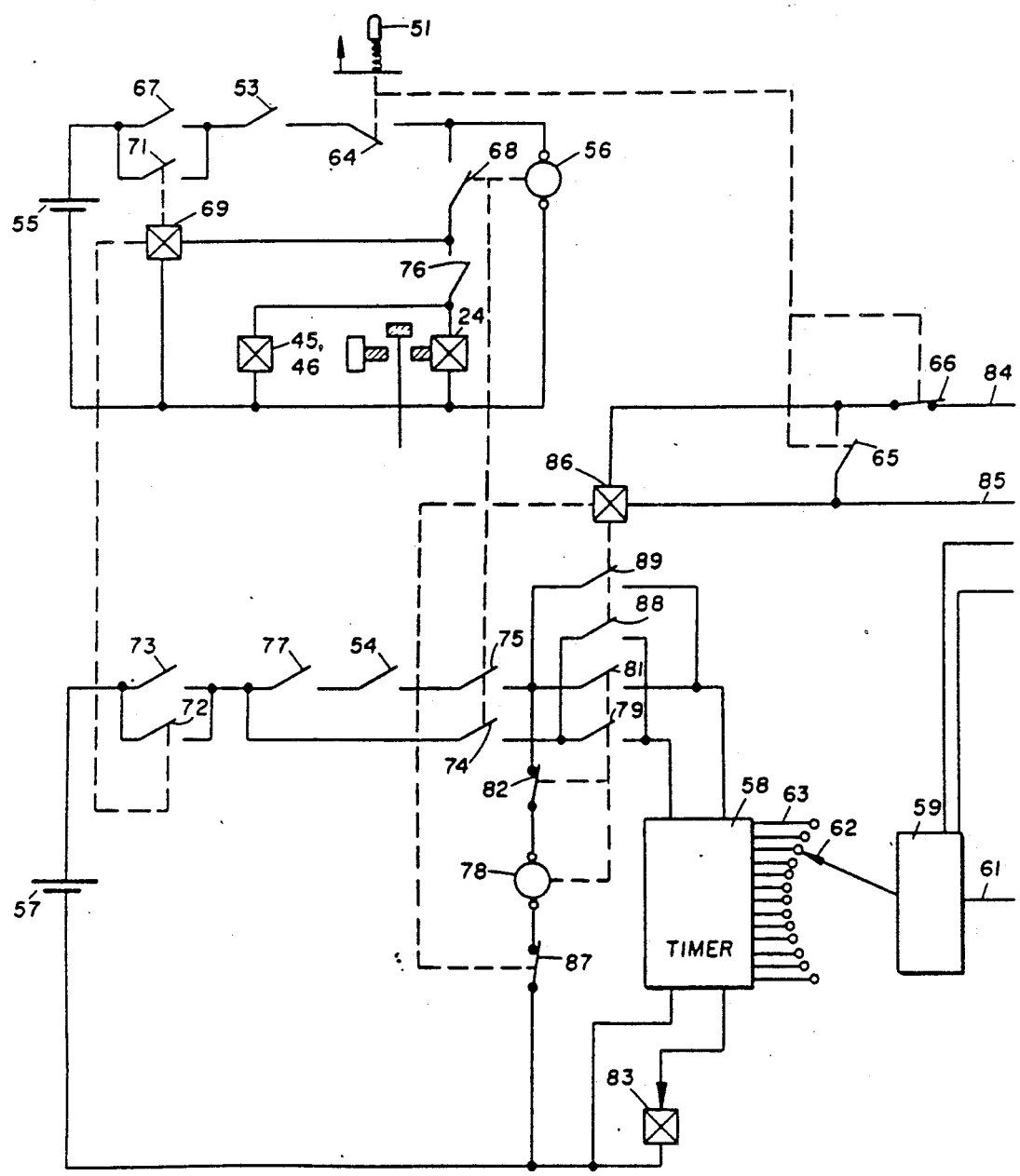

United States Patent [19]

Will et al.

[11] Patent Number: 5,003,515

[45] Date of Patent: Mar. 26, 1991

[54] SUBMARINE EMERGENCY COMMUNICATION TRANSMITTER

[75] Inventors: Albert S. Will, Bethesda; Frank C. McLean, Silver Spring; Sylvan Wolf, Hyattsville; Samuel H. Kauffman, Silver Spring; John C. Hetzler, Jr., Laurel; Charles A. Lewis; George E. Maxim, both of Silver Spring, all of Md.

[73] Assignee: The United States of America as represented by the Secretary of the Navy, Washington, D.C.

[21] Appl. No.: 371,142

[22] Filed: May 28, 1964

[51] Int. Cl.$^5$ ............................................ H04B 11/00
[52] U.S. Cl. .................................... 367/131; 367/145
[58] Field of Search ............... 367/131, 133, 134, 137, 367/145; 181/116; 102/206, 392

[56] References Cited

U.S. PATENT DOCUMENTS

| | | | |
|---|---|---|---|
| 2,587,301 | 2/1952 | Ewing | 367/127 |
| 2,760,180 | 8/1956 | Sipkin | 367/133 |
| 2,949,853 | 8/1960 | Vogt | 102/407 |
| 2,981,927 | 4/1961 | McKenney | 367/1 |
| 3,102,475 | 9/1963 | Beckwith, Jr. | 181/116 |

Primary Examiner—Thomas H. Tarcza
Assistant Examiner—Daniel T. Pihulic
Attorney, Agent, or Firm—Kenneth E. Walden; R. J. Erickson

[57] ABSTRACT

An underwater acoustic transmitter adapted to be released from a submerged submarine to float towards the surface of the water and explode a plurality of signalling charges at a predetermined depth in a predetermined time sequence.

11 Claims, 2 Drawing Sheets

SUBMARINE EMERGENCY COMMUNICATION TRANSMITTER

The invention described herein may be manufactured and used by or for the Government of the United States of America for governmental purposes without the payment of any royalties thereon or therefor.

The present invention relates to an underwater acoustic transmitter and more particularly to an underwater sound transmitting device adapted to be released from a submerged submarine to float to the surface of the water and explode a plurality of signaling charges at a predetermined depth in a predetermined time sequence.

There has long been a need for an emergency communication system by which a disabled submerged submarine may transmit a message to other submarines, ships and shore stations to notify those stations that subject submarine is in distress and incapable of successfully completing its mission. The present invention fulfills this need.

The present invention provides a transmitter housed in a buoyant vessel adapted to be released from a submerged submarine. The transmitter rises to the surface of the water where it floats with a minimum of freeboard for a predetermined period of time after which a timing device releases a plurality of explosive charges in a time-coded sequence. The exploding charges produce an acoustic signal which may be sensed and recorded at distant locations by conventional transducers and the signal may subsequently be decoded to read the message. The transmitter further includes means to change the time-coded sequence by which the charges are released so that any one of several messages may be transmitted.

One of the objects of the present invention is to provide a new and improved underwater explosive signaling device.

Another object is to provide a new and improved underwater signaling device adapted to be released from a submarine either by a command signal or alternatively upon the sensed existence of an extreme hydrostatic pressure.

A further object of the invention is to provide an underwater signaling device capable of normally transmitting a single programmed message and which alternatively may be remotely controlled by a submarine to transmit any one of a number of preselected messages.

Figure 1:
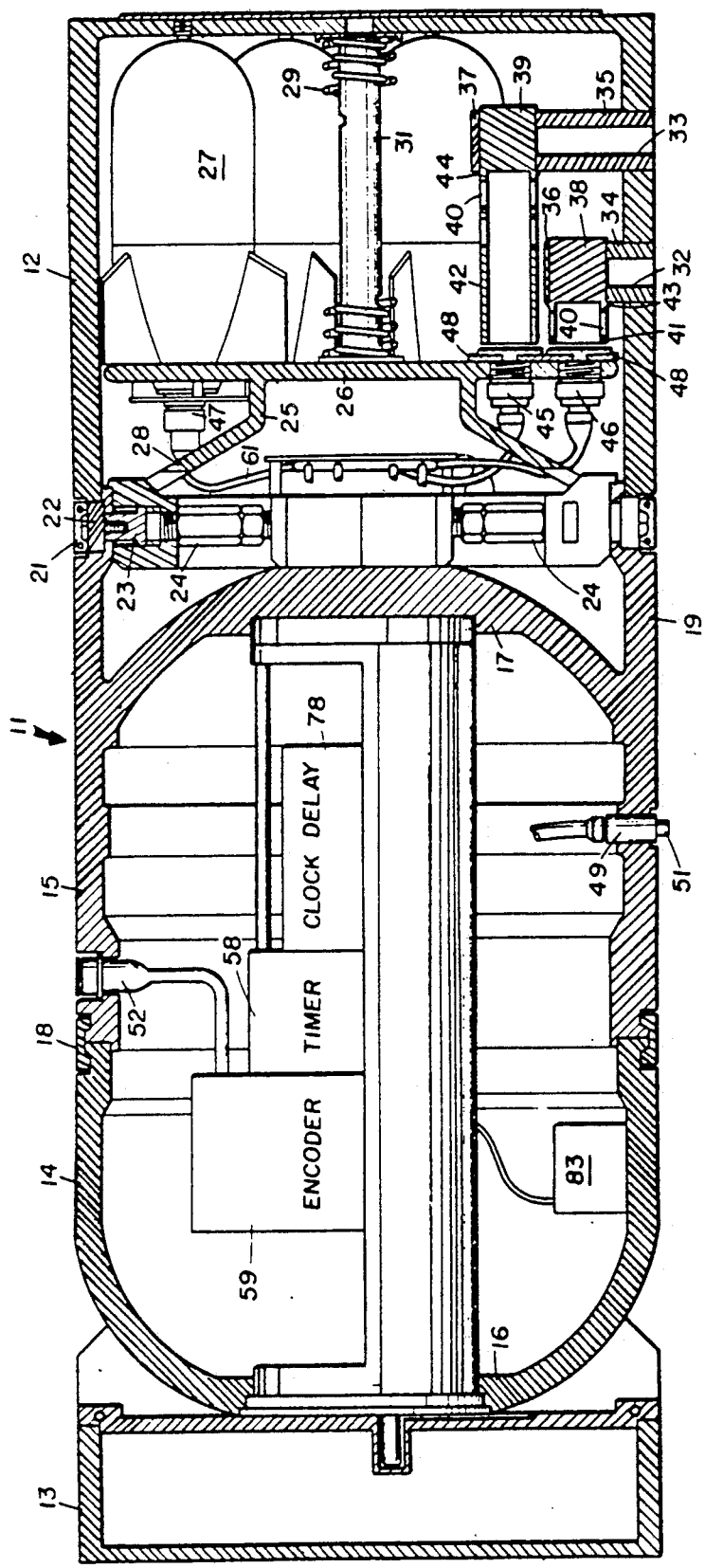

FIG. 1 is a longitudinal sectional view of the device according to the present invention; and FIG. 2 is a circuit diagram for use with the device of FIG. 1.

As seen in FIG. 1, the emergency transmitter is an elongated cylindrical member having a main body or casing 11 near the center thereof, a forward casing 12, and a buoyancy tank or buoyancy chamber 13 attached to the after end thereof. Main casing 11 is comprised of two generally cylindrical cup-shaped members 14 and 15, each of which are closed at one end by end walls 16 and 17, respectively, and which abut together at their open ends. The cup-shaped members are held together in abutting contact at their open ends by an annular clamping band 18 to define a closed cylindrical watertight chamber within said cup-shaped members. Formed integrally with the forward end of cup-shaped member 15 is an annular flange 19 forming an extension of the pressure hull of said cup-shaped member. The open end of the cup-shaped forward casing 12 is adapted to abut against the forward end of the annular flange extension 19 and an annular clamping band 21 is fitted around the juncture of members 12 and 19 to form a watertight seal therebetween. To facilitate separation of the forward casing 12 from the main casing 11 at the desired instant of time, one or more knife edges or chisels 22 are provided to sever the retaining bolts, not shown, on the clamping band. The knife edges 22 are fixedly secured to one end of pistons 23 adapted to be driven by explosive drivers 24, the drivers being automatically ignited at the desired instant of time. Two explosive drivers and associated pistons and knife edges are provided so that the clamping band is cut even if one explosive driver malfunctions. Fixedly secured to the forward end wall 17 of the main casing 11, is a support structure or bridge 25 which provides a circular platform 26 for the mounting of the explosive charges or drop bombs 27. Seven explosive charges or drop bombs 27 are provided within the interior of the forward casing 12, each of which is mounted by its tail section to the circular platform 26 by means of a shear connector. A helical compression spring 29 is mounted coaxially within the forward casing 12 and abuts against circular platform 26 at one end and at its other end against the end wall of the forward casing 12. A tubular member 31 is provided coaxially within the helical spring to maintain the spring in its intended position, whereby the spring is normally held in compression when the forward casing 12 is attached to the central casing 11 by means of the clamping band. When it is desired to separate the forward case from the main casing, the explosive drivers 24 are ignited, thereby severing the retaining bolts on the clamping band, releasing the clamping band, and permitting the compression spring 29 to thrust the forward casing 12 away from the rest of the assembly.

It is desirable to have the forward casing 12 separate from the main assembly at a predetermined depth of submergence and before the transmitter ascends to the surface of the body of water. Accordingly, suitable apparatus is incorporated in the system for equalizing the differential in the pressures encountered on the inside of the casing relative to that existant on the outside of the forward casing. The forward casing is free of water and the hydrostatic pressure existent at the depth at which separation occurs greater in magnitude than the force of spring 29. It thus prevents the forward casing from falling away from the rest of the assembly until the assembly has ascended to the water surface. Therefore, first and second flooding ports 32 and 33, respectively, are provided in the peripherial wall of the forward casing. The flooding ports are formed by first and second tubular members 34 and 35, each of which extend inwardly of said peripheral wall and are closed at their inner ends 36 and 37, respectively. The tubular members 34 and 35 have transverse apertures formed therein to receive closure valves 38, 39, respectively. The closure valves or flooder valves 38 and 39 are mounted upon tubular flooder valve shafts 41 and 42, respectively, which extend from the flooder ports to a point adjacent the circular platform 26. The flooder valves are normally held in sealing contact with the walls of tubes 34 and 35 by means of the end closures 36 and 37 and further by means of annular flanges 43 and 44 formed integrally with the valve shafts which engage the wall of the tubes 34 and 35. When the forward case 12 is to be separated from the main assembly, a pair of explosive drivers 45 and 46 are electrically ignited simultaneously with the ignition of the explosive drivers 24, which sever the retaining bolts of the clamping band. Detonation of the explosive drivers 45 and 46 produces a forward thrust of pistons 48 which abut against the after ends of the valve shafts 41 and 42 and communicate through platform 26 with the chambers of the explosive drivers to shear the annular flanges 43 and 44 and thrust said shafts forward, thus permitting water to flow through the flooder ports and into apertures 40 formed in the valve shafts and then into the interior of the forward casing 12. As the water flows into the forward casing under the influence of the hydrostatic pressure, the pressure differential previously existing across the walls of said casing is eliminated and the helical spring is then capable of thrusting the casing away from the main assembly while the assembly is still rising to the surface.

Within the forward casing 12 and mounted upon the bridge support 25 is a plurality of explosive bolts 47, one bolt being provided for each of the seven explosive charges or drop bombs. After the forward casing has been separated and the main assembly has reached the surface of the water, the explosive bolts 47 are sequentially initiated in a time coded sequence by electrical signals received from a timer positioned within the main casing 11; and upon initiation by an electrical signal, the explosive bolt severs the shear connection by which the drop bomb is connected to the circular platform 26 and thereby enables the drop bomb to fall freely away from the floating assembly. The explosive bolts 47 perform a second function in that they initiate a twenty-second pyrotechnic delay column within the drop bomb which permits the drop bomb to sink to a suitable depth for acoustic transmission, for example, four hundred feet.

The buoyancy chamber, which is fixedly secured to the after end of the assembly, is of such volume as to enable the assembly to float on the surface of the water with a minimum of freeboard, for example, the buoyancy chamber is the uppermost portion of the floating assembly and floats with only about one inch of its structure above the surface of the water. To further hinder the visual detection of this floating assembly, the buoyancy chamber is provided with suitable camouflaging.

All of the control components are mounted upon an instrument rack within the main or central casing 11, and are connected to the explosive drivers 24, 45, 46 and 47 by suitable electrical conductors 61 which pass through apertures in end wall 17 of the casing provided with conventional sealing means. The forward casing is attached to the main assembly in such a manner as to form a watertight seal and is free of water in its interior at all times prior to separation from the main casing. It is only at shallow depths, e.g. twenty feet, that the forward casing is released and therefore only small pressure differentials would exist across end wall 17, for which reason leakage of water into the instrument compartment is easily avoided.

The entire transmitter is adapted to be mounted in a suitable launcher which is located outside the pressure hull of the submarine but inside of the submarine's superstructure. The control instruments within the transmitter are electrically connected to a watertight connector 52 which is sealingly received within an aperture formed in an outer peripheral wall of the central casing and which makes contact with an external umbilical cable leading to the interior of the submarine. When the transmitter is in its launching rack and the connector 52 is connected to the umbilical cord, the crew in the submarine may control an encoder and thereby determine which specific message of a number of prearranged emergency messages will be transmitted by the emergency transmitter. When the transmitter is released from the launching rack, the connector 52 is separated from the umbilical cord. A safety switch 49 is sealingly mounted within an aperture formed in the outer peripherial wall of the central casing 11 and is provided with a plunger 51 which is resiliently biased outwardly to contact a portion of the structure of the launcher. The purpose of the switch is to open the control circuit and function as a safety device to prevent any possible actuation of the explosive transmitter when the transmitter is mounted in its launching rack on board the submarine. To insure against accidental actuation of the device during handling of the transmitter prior to mounting of the transmitter in its launching rack or after mounting when the submarine is in port, a pair of remote safety switches 53 and 54 are provided in the control circuit, as shown in FIG. 2, and these switches may be closed when desired by a common electric motor operated by a control circuit within the submarine by virtue of conductors of the umbilical cable. The remote safety switch 53 is connected in a circuit with battery 55 and a motor driven switch actuator 56 which is mechanically coupled to a plurality of switches to close said switches at predetermined time intervals. The remote safety switch 54 is connected in a circuit between battery 57 and a timer 58 which provides electrical signals at preselected variable time intervals which signals are relayed by way of an encoder 59 and conductors 61 to the drop bombs 27. In actuality, there are seven electrical conductors 61, each of which is connected to one of the explosive drivers 47 which drivers in turn function to effect the release and ignition of the individual drop bombs 27. At their other ends, the seven conductors 61 are connected to seven individual encoders 59, which may be of the stepping switch type and which control the point of contact of a conductor or wiper 62 upon the contacts of the timer 58. There are seven conductors 61, seven stepping switches 59 and seven wipers 62 employed in the transmitter, but for the sake of simplicity, only one of each has been illustrated in FIG. 2 of the drawings. Timer 58 may be of the type which provides electrical impulses at predetermined constant time intervals successively along a plurality of contacts 63 provided on the timer. Hence the time at which a signal is transmitted through stepping switch 59 and conductor 61 is determined by the position of the wiper 62 for that particular stepping switch relative to one of the respective individual contacts 63. Plunger 51 of the switch 49 is shown in FIG. 2 in the position which it occupies when the transmitter is mounted in its launcher. The plunger is resiliently biased outwardly by the spring and upon release of the transmitter from the launcher, causes the actuation of a plurality of switches which are mechanically coupled to the plunger 51. Switches 64 and 65 are normally held open by the plunger 51 while switch 66 is connected to the plunger in such a manner as to be normally closed when the transmitter is mounted in the launcher. Upon release of the transmitter from the launcher, switches 64 and 65 close while switch 66 opens and current is then supplied from battery 55 to the motor driven switch assembly 56. Attention is directed to two contemporaneously preexistant conditions of the circuitry, the first being that the hydrostatic switch 67 is held closed by applied forces correlative to the existant hydrostatic pressure and the second being that remote safety switch 53 had previously been closed when the transmitter was loaded on the launcher. Hydrostatic switch 67 is of such nature as to automatically close upon exposure to forces existant seventy-five feet of water depth or greater, at which depths the transmitter is normally intended to be launched. Upon launch and the closure of the aforementioned switches, the motor driven switch assembly 56 beings to operate and after the completion of a short time interval, such as approximately five seconds, switch 68 is closed by virtue of the mechanical connection between said switch and the assembly 56, shown in dotted line form, thus closing a circuit through the explosive driver 69, causing said driver to detonate. Switches 71 and 72 are mechanically coupled to the explosive driver 69 by the dotted line connection, and upon detonation of said explosive driver, become closed and are of such structure as to remain closed even after the transmitter floats to a depth less than seventy-five feet when hydrostatic switches 67 and 73 open. Hydrostatic switch 73 is also of such a nature as to close at a depth of seventy-five feet or greater and to be normally open at depths less than seventy-five feet. Switches 71 and 72 shunt the circuit around the hydrostatic switches so as to maintain continuity of the circuit after the hydrostats open. Further operation of the motor driven switch assembly 56 causes a switch 74 to close after a predetermined interval of time, such as forty-five seconds, and causes a second switch 75 to close after a further interval of time such as sixty seconds, the closure of said switches being effected by the mechanical connections shown in dotted line form in FIG. 2. As the transmitter continue to rise to the surface and reaches a depth of twenty feet, for example, a third hydrostatic switch 76 is caused to close and to thereby complete a circuit from the battery through the explosive drivers 24, 45 and 46, to thereby sever the retaining bolts on the clamping band of the forward casing 12 and to also actuate the pistons 48 to move the flooder shafts and open the flooder valves. Upon opening of the flooder valves, water rushes through said valves into the interior of the forward casing 12, filling said casing and eliminating the pressure differential across the walls of said casing to permit the compression spring 29 to thrust the forward casing away from the main casing of the floating transmitter, the forward casing then falling freely away from the transmitter and exposing the drop bombs to the water. A fourth hydrostatic switch 77 is also normally open below 20 feet of depth, for example, and is caused to close when the transmitter floats and rises to the depth of 20 feet. This effects a closing of the circuit between the battery 57 and the time delay mechanism 78 which operates to hold switches 79 and 81 open to prevent operation of the timer 58 by the battery 57 until the expiration of a predetermined time interval. The time delay mechanism 78 may be set to delay the operation of the transmitter until the expiration of a time interval after which the transmitter is expected to be able to function safely without risk of detection by the enemy. While the delay mechanism 78 runs for a period which is variable from 1 hour to 24 hours, depending upon setting thereof, the transmitter floats at the surface of the water with only one inch of freeboard and is suitably camouflaged to avoid any possible visual detection by the enemy. At the expiration of the predetermined time interval set into the delay mechanism, the switch 79 is closed and approximately 15 seconds later switch 81 is closed by means of the mechanical connections between those switches and the delay mechanism as shown in dashed line form, FIG. 2 which mechanical connection further causes the opening of a switch 82 simultaneously with the closure of switch 81. Upon the closure of switches 79 and 81 and the opening of switch 82, the circuit to the delay mechanism 78 is broken and a complete circuit is provided from the battery 57 to the timer 58 thus causing the timer to begin to function in its normal manner and to cause the ignition of the drop bombs at a predetermined time-coded sequence. After all of the drop bombs have been released, the timer preferably, is programmed to a final charge 83 within the assembly, the purpose of which is to blow up and scuttle the device to avoid any opportunity for the enemy to pick up and analyze the transmitter.

In some instances, it may be desirable to cause the transmitter to begin cycling to effect firing of the drop bombs immediately upon reaching the surface of the water, in which instance provision is made within the device to provide for the external firing thereof. In order to cause the operation of the timer 58 to begin cycling immediately upon the arrival of the transmitter of the surface of the water, an electrical impulse is sent through electrical conductor 84 and 85 which extend through the umbilical cable and connector from a control panel within the submarine to an explosive driver 86 located within the transmitter casing. The explosive driver 86 is actuated while the transmitter is still mounted on its launcher on board the submarine, during which time switch 66 is maintained in a closed condition by means of the mechanical connection between it and plunger 51. Upon the detonation of the explosive driver 86, a switch 87 mechanically coupled to the explosive driver, as shown in the dashed line form, FIG. 2, is opened. Consequently, this action breaks the circuit to the time delay mechanism 78 and renders the delay mechanism ineffective. A second mechanical connection to the explosive driver 86 is employed to close a pair of switches 88 and 89 which complete the circuit between the battery 57 and the timer 58 to thereby initiate the cycling of the timer as soon as the transmitter floats to the surface of the water.

In operation, the transmitter may be released from its launcher on board the submarine either by means of a command signal or alternatively by being exposed to a predetermined maximum hydrostatic pressure. Prior to release from the launcher, the normal operation of the transmitter may be modified by means of the explosive switch 86 and the switches mechanically coupled thereto to short out the time delay mechanism 78 and obviates its delay function and thereby permit the timer 58 to begin cycling immediately upon the surfacing of the transmitter. If the transmitter is intended to send a signal other than the normal distress signal, the plurality of stepping switches 59 may be selectively actuated from a control panel within the submarine by means of electrical conductors extending through the umbilical cable to the stepping switches. A separate stepping switch is employed for each of the drop bombs and its associated wiper 62 is arranged to selectively contact the plurality of corresponding contacts 63 on the timer, the number of which may be varied as desired to provide the necessary number of combinations of time coded sequences desired to transmit the number of messages to be sent. When the transmitter is released from the launcher, the 75 foot hydrostatic switches are closed and other switches mechanically coupled to the plunger 51 are also closed to cause the motor driven switch assembly 56 to begin operating, which switch assembly then functions to operate explosive driver 69 and permanently close switches 71 and 72 and further functions to close switches 74 and 75. As the transmitter continue to rise to the surface and reaches a depth of 20 feet, the switches 76 and 77 are caused to close thus igniting the explosive drivers for the flooders and also igniting the explosive drivers for the knife edges or chisels which sever the retaining bolts on the clamping band 21 to thereby permit the forward case 12 to freely fall away from the transmitter assembly. Closure of hydrostatic switch 77 begins the operation of the time delay mechanism 78 which, upon the expiration of the predetermined time interval, causes switches 81, 79 to close and consequently actuate the timer 58 which then ejects and ignites the drop bombs according to a predetermined time coded sequence. The drop bombs then sink for approximately 20 seconds by means of the pyrotechnic delay column, until the charges have reached a suitable depth for acoustic transmission. The signals generated by the drop bombs in a predetermined time coded sequence transmit a message which may be accurately and reliably sensed and recorded by conventional transducers at great distances.

The device as herein described provides an extremely reliable acoustic transmitter for sending messages from a submerged submarine to other submarines, ships and shore stations. The device is rugged and reliable and may be launched automatically even when the submarine is completely disabled, thereby to inform other ships, submarines, and shore stations that the submarine is incapable of completing its mission.

Obviously many modifications and variations of the present invention are possible in light of the above teachings. It is therefore to be understood that within the scope of the appended claims the invention may be practiced otherwise than as specifically described.

What is claimed is:

1. An emergency communication transmitter adapted to be released from a submerged submarine, comprising
   a water-tight buoyant housing,
   a plurality of explosive charges detachably mounted within the housing, and
   control means within the housing and connected to said charges for releasing and detonating the charges in a predetermined time-coded sequence to thereby transmit an acoustic message through the water said control means comprising:
   a source of electrical energy,
   a timer electrically connected in series with said source and with the explosive charges for releasing the charges in a time-coded sequence,
   pressure responsive switch means connected in series with said source and the timer to complete a circuit therebetween when the transmitter has been launched and has ascended to a predetermined depth below the surface of the water, and
   a remotely operated code changing means mounted within said housing and connected to said timer and operable from within the submarine, in a manner whereby the time-coded sequential release of the charges may be selectively varied to transmit any one of a plurality of standard messages.

2. The device of claim 1 wherein the code changing means comprises
   a plurality of stepping switches, each of which is connected to an electrical conductor leading to an explosive charge for changing the point of contact of said conductor upon a plurality of contacts on said timer.

3. An emergency communication transmitter for a submarine, comprising
   a closed cylindrical case,
   a cup-shaped forward case having its open end sealingly and detachably mounted upon one end of the cylindrical case,
   a charge support connected to said one end of said cylindrical case and extending partially into the forward case,
   a buoyancy chamber fixedly secured to the other end of the cylindrical case,
   a plurality of explosive charges positioned within said forward case and detachably mounted upon said support by means of a shear connector,
   a plurality of explosive drivers, one driver being connected to each of the respective charges to break the shear connector and ignite the charge,
   a timer positioned within the hollow cylindrical case and being electrically connected to each explosive driver for successively actuating said drivers in a time-coded sequence,
   means coupled to the forward case for jettisoning the forward case prior to release of the explosive charges,
   whereby the transmitter may be released from a submerged submarine to float to the surface and release the explosive charges in a predetermined time coded sequence to transmit an acoustic message.

4. The transmitter of claim 3 wherein the cup-shaped forward case is sealingly connected to an annular flange extending axially on said one end of the cylindrical case by means of an annular clamping band which engages a portion of said flange and a portion of said forward case, and
   said means for jettisoning the forward case comprises an explosive driver actuated by a hydrostat and operative upon a knife edge for severing said annular clamping band.

5. The transmitter of claim 4 further comprising means for flooding the interior of the forward case when the annular clamping band is severed.

6. The transmitter of claim 5 wherein said forward case has flooding ports formed therein, each of which is sealingly closed by a flooder valve, and
   a second explosive driver connected to said hydrostat and said valves,
   whereby the hydrostat actuates the second explosive driver to open the flooder valves simultaneously with the severing of the annular clamping band.

7. The transmitter of claim 3 further comprising
   a settable time delay mechanism coupled to said timer for preventing actuation of the timer and release of the acoustic signal producing charges until the expiration of a predetermined time duration subsequent to launching and surfacing of the transmitter.

8. The transmitter of claim 3 further comprising
   means coupled to the timer and operable from within the submarine for charging the time coded sequence by which the timer causes actuation of the explosive drivers.

9. The transmitter of claim 8 wherein said code changing means comprises a plurality of stepping switches connected to the timer.

10. The transmitter of claim 9 further comprising a settable time delay mechanism coupled to the timer to prevent actuation thereof prior to the expiration of a predetermined duration of time after the transmitter has been launched.

11. The transmitter of claim 3 wherein each of said explosive charges contains a pyrotechnic delay column therein, whereby the charge is permitted to sink to a suitable depth for acoustic transmission before detonation of the charge.

* * * * *